United States Patent
Nicholas

(10) Patent No.: US 6,453,535 B1
(45) Date of Patent: Sep. 24, 2002

(54) PROCESS FOR MANUFACTURING AN AUTOMOTIVE TRIM PIECE PREWEAKENED TO FORM AN AIR BAG DEPLOYMENT OPENING

(75) Inventor: Antonios Nicholas, Belle Mead, NJ (US)

(73) Assignee: TIP Engineering Group, Inc., Farmington Hills, MI (US)

( * ) Notice: Subject to any disclaimer, the term of this patent is extended or adjusted under 35 U.S.C. 154(b) by 0 days.

(21) Appl. No.: 09/339,319

(22) Filed: Jun. 23, 1999

Related U.S. Application Data

(60) Provisional application No. 60/090,622, filed on Jun. 25, 1998.

(51) Int. Cl.$^7$ .................................................. B23P 17/00
(52) U.S. Cl. ........................ 29/413; 29/428; 280/728.3
(58) Field of Search ................ 29/428, 413; 280/728.1, 280/728.2, 728.3

(56) References Cited

U.S. PATENT DOCUMENTS

| | | | | |
|---|---|---|---|---|
| 5,131,678 A | * | 7/1992 | Gardner et al. | 280/732 |
| 5,154,444 A | * | 10/1992 | Nelson | 280/732 |
| 5,217,244 A | * | 6/1993 | Bauer | 280/728 |
| 5,421,608 A | * | 6/1995 | Parker et al. | 280/728.3 |
| 5,447,328 A | * | 9/1995 | Iannazzi et al. | 280/728.3 |
| 5,484,561 A | * | 1/1996 | Weber et al. | 264/46.4 |
| 5,582,424 A | * | 12/1996 | Okuyama et al. | 280/728.3 |
| 5,630,613 A | * | 5/1997 | Leonard et al. | 280/728.3 |
| 5,673,931 A | * | 10/1997 | Gray et al. | 280/728.3 |
| 5,738,367 A | * | 4/1998 | Zichichi et al. | 280/728.3 |
| 5,744,776 A | * | 4/1998 | Bauer | 219/121.7 |
| 5,775,727 A | * | 7/1998 | Sun et al. | 280/728.3 |
| 5,816,609 A | * | 10/1998 | Gray et al. | 280/728.3 |
| RE36,003 E | * | 12/1998 | Sato | 280/728.3 |
| 5,845,931 A | * | 12/1998 | Nagy et al. | 280/728.3 |
| 5,868,419 A | * | 2/1999 | Taguchi et al. | 280/728.3 |
| 5,871,229 A | * | 2/1999 | Saito | 280/732 |
| 5,883,356 A | * | 3/1999 | Bauer et al. | 219/121.62 |
| 5,901,977 A | * | 5/1999 | Knox et al. | 280/728.3 |
| 5,941,558 A | * | 8/1999 | Labrie et al. | 280/728.3 |
| 5,964,477 A | * | 10/1999 | Lehman | 280/728.3 |
| 5,975,563 A | * | 11/1999 | Gallagher et al. | 280/728.3 |
| 5,979,931 A | * | 11/1999 | Totani et al. | 280/728.3 |
| 5,997,030 A | * | 12/1999 | Hannert et al. | 280/728.3 |
| 6,045,153 A | * | 4/2000 | Sommer et al. | 280/728.3 |
| 6,050,595 A | * | 4/2000 | Knox | 280/728.3 |
| 6,070,901 A | * | 6/2000 | Hazell et al. | 280/728.3 |
| 6,164,686 A | * | 12/2000 | Rupp | 280/728.3 |
| 6,203,056 B1 | * | 3/2001 | Labrie et al. | 280/728.3 |
| 6,224,090 B1 | * | 5/2001 | Lutze et al. | 280/728.3 |
| 6,237,933 B1 | * | 5/2001 | Takahashi et al. | 280/728.3 |
| 6,247,722 B1 | * | 6/2001 | Brodi, Jr. et al. | 280/728.3 |
| 6,250,669 B1 | * | 6/2001 | Ohmiya | 280/732 |
| 6,254,122 B1 | * | 7/2001 | Wu et al. | 280/730.2 |
| 6,260,875 B1 | * | 7/2001 | Stawicki et al. | 280/728.3 |
| 6,325,415 B1 | * | 12/2001 | Zelinski et al. | 280/743.2 |
| RE37,540 E | * | 2/2002 | Iannazzi et al. | 280/728.3 |
| 6,357,788 B2 | * | 3/2002 | Kreile | 280/728.3 |
| 6,402,189 B1 | * | 6/2002 | Gray et al. | 280/728.3 |

OTHER PUBLICATIONS

US 5,971,426, 10/1999, Cuevas et al. (withdrawn)*

* cited by examiner

Primary Examiner—S. Thomas Hughes
Assistant Examiner—Essama Omgba
(74) Attorney, Agent, or Firm—John R. Benefiel

(57) ABSTRACT

A process for manufacturing a trim piece to provide a concealed deployment door and opening for an air bag in which a substrate panel is formed with one or more integral door panels having an interposed gap preformed between one or more door panels and the substrate panel, and one side of each door panel is integral with the substrate panel structure to form a hinge. The substrate panel is overlain with one or more covering layers extending over the door panel or panels and opening. The covering layers can be preweakened along the gap in a correlated pattern, as by laser scoring.

6 Claims, 3 Drawing Sheets

PROCESS FOR MANUFACTURING AN AUTOMOTIVE TRIM PIECE PREWEAKENED TO FORM AN AIR BAG DEPLOYMENT OPENING

CROSS REFERENCE TO RELATED APPLICATION

This application claims the benefit of the filing date of provisional application 60/090,622 filed of Jun. 25, 1998.

BACKGROUND OF THE INVENTION

This invention concerns the manufacture of trim pieces such as instrument panels and steering wheel covers which overlie air bag installations, and more particularly processes for manufacturing trim pieces which have air bag canisters installed behind the trim pieces which are preweakened to allow an inflating air bag to form a deployment opening by forcing a concealed door section of the trim piece to separate and swing out from the adjacent portion of the trim piece structure.

One or more hinged deployment door panels overlying the air bag have long been incorporated in such auto trim pieces, which are held closed by tabs or other elements and are then forced open by the inflating air bag when the air bag is deployed.

In recent years, so called "invisible seam" installations have been developed, in which the separate visibly delineated doors initially used have been eliminated, and a smooth overlying covering extends over the trim piece location whereat the air bag is mounted.

An opening is formed in the trim piece when the air bag is activated by the inflating air bag forcing itself through a section of the trim piece. This is accomplished by a preweakening of the trim piece at the air bag location to allow the pressure of the inflating air bag to cause a "door" tear in the trim piece to break free and hinge open along one side.

Trim pieces are often constructed in layers including a stiff substrate panel, and overlying skin and foam covering layers, or with a skin bonded to a substrate panel.

The substrate may be molded first, and the skin and foam added subsequently.

The preweakening has involved the formation of preweakening grooves in the trim piece and/or covering layers molded into the piece, or the formation of the grooves as by laser scoring of the trim piece or components thereof.

A separate door panel is often fit into an opening molded into the substrate panel, but this requires additional processing steps.

Cutting through a substrate panel to form the door has also been practiced, but this requires a powerful cutting apparatus to sever the relatively thick substrate, increases cycle time, and in the case of laser cutting, requires handling of the by-products generated by vaporizing of the substrate material.

It is the object of the present invention to provide a simplified method of manufacturing an automotive trim piece which is preweakened to form an invisible seam deployment door opening for air bags.

SUMMARY OF THE INVENTION

The above object and other which will be understood upon a reading of the following specification and claims is achieved by a process in which a substrate panel is preformed with one or more deployment door panels, each integrally connected along one side to adjacent portions of the substrate panel, and with a gap spacing the unconnected door sides from the adjacent substrate sections. The connected side of the door panel functions as a hinge when the panel is contacted by the inflating air bag.

Bridging tabs may optionally be formed extending across the gap at one or more locations to stabilize the panel with respect to the rest of the substrate panel.

The one or more covering layers are later added or formed at the same time to overlie the substrate panel. The covering layers may also be cut or scored as by directing a laser beam or other scoring or cutting agent through and along the gap, and tracing along the path of the gap in a door pattern, to preweaken the covering layer in a pattern corresponding to the free, unhinged sides of the door sections.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
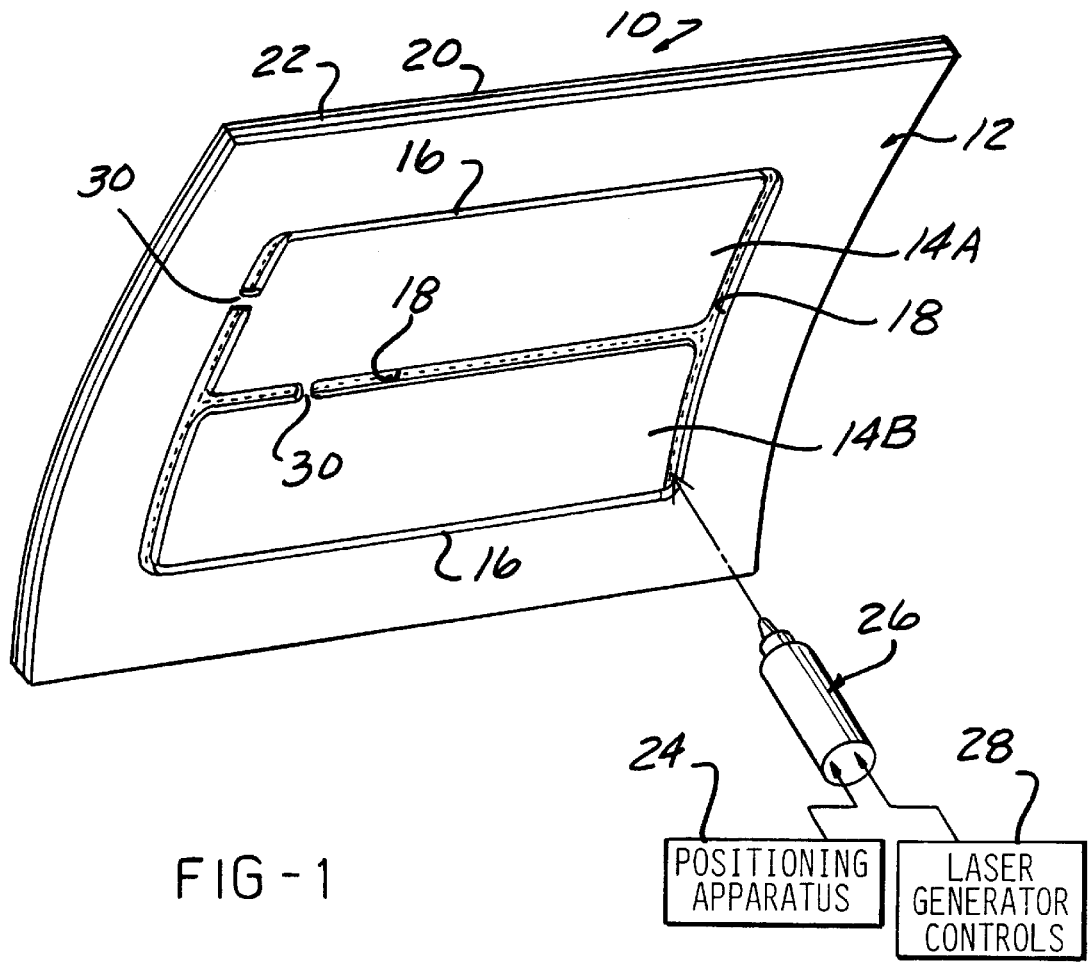
FIG. 1 is a perspective view of a trim piece having a double deployment door formed as a part of the process of the present invention, the trim piece being preweakened by laser beam apparatus depicted diagrammatically.

Referring to the Drawings, FIG. 1 shows the inside of a trim piece 10 comprised of a substrate panel 12 which provides the structural integrity of the trim piece 10, and hence is thick enough to be relatively rigid.

The substrate panel 12 can be constructed using conventional materials such as suitable polymers or wood fiber, and using conventional processes such as injection molding, casting, and thermoforming.

In the embodiment shown in FIG. 1, a deployment opening is defined by a pair of generally rectangular deployment door panels 14 integrally connected along one of the sides 16, each defining a parallel hinge axis for swing out movement of the door panels 14.

The perimeter of the other three sides of the door panels 14 are defined by a gap pattern 18 which may be preformed at the same time as the substrate panel 12 itself.

The substrate panel 12 has one or more covering layers 20 which overlie the exterior of the substrate panel 12, i.e., the side of the trim piece 10 exposed to view within the passenger compartment. The covering layer 20 may be a flexible skin of a plastic such as TPO and may be supported by a foam layer 22. The covering layers 20, 22 extend smoothly over the door panels 14 and the gap 18 to render the door panels 14 not visible to a passenger or driver within a vehicle passenger compartment. The substrate panel is generally attached to a rigid supporting structure in the vehicle.

The inside of the cover layers 20, 22 are exposed within the perimeter gap 18 so as to allow a preweakening cut 19 to be applied after the trim piece has been completed to eliminate the need to align a preweakened cover layers 20, 22 with the door panels 14.

Such preweakening is preferably carried out with a laser beam, as described in detail in U.S. Pat. Nos. 5,744,776 and 5,883,356, issued to the same assignee as the assignee of the present application. Other processes may also be used, such as a mechanical knife (as described in U.S. Pat. No. 5,217,244, also assigned to the assignee of the present application).

Ultrasonic, hot knife, and water jet machining are other processes which may be used.

A laser beam generator 26 is shown in FIG. 1, with positioning apparatus 24 provided to cause the laser beam to trace along the gap 18 so as to cause continuous or intermittent scoring of the covering layers 20, 22 to accomplish a preweakening as described in the above referenced patents. A gauging sensor (not shown) may also be used to carry out a particular preweakening program, and laser generator controller 28 may vary the laser power, velocity, etc. to in turn vary the depth or extent of scoring or cutting to achieve a desired degree of preweakening along the gap pattern 18.

As also shown in FIG. 1, bridging tabs 30 may extend across the gap 18 at selected locations to provide strength to the trim piece 10 by connecting the door panels 14A, 14B to each other and to the adjacent regions of the substrate panel 14.

Figure 2:
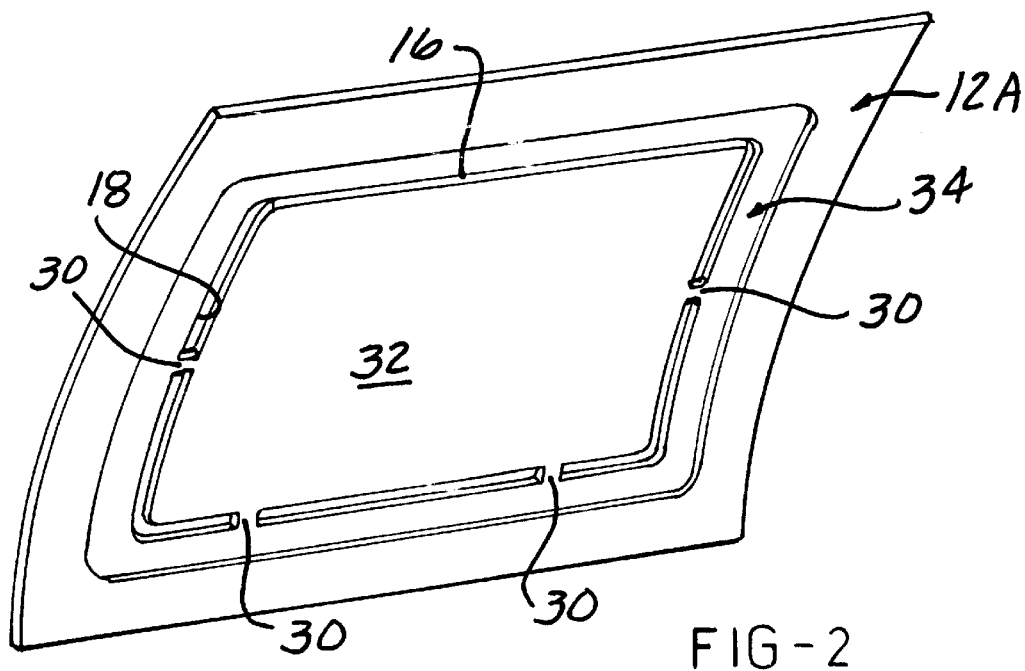
FIG. 2 is a perspective view of a single door substrate panel formed as a part of the process of the present invention.

FIG. 2 shows the application to a substrate panel 12A having only a single deployment door panel 32. Also shown is a stiffener frame 34 affixed to the perimeter of the gap 18A and door panel 32 to stiffen the substrate panel 12A for purposes as described in U.S. Pat. Nos. 5,393,088.

Figure 3:
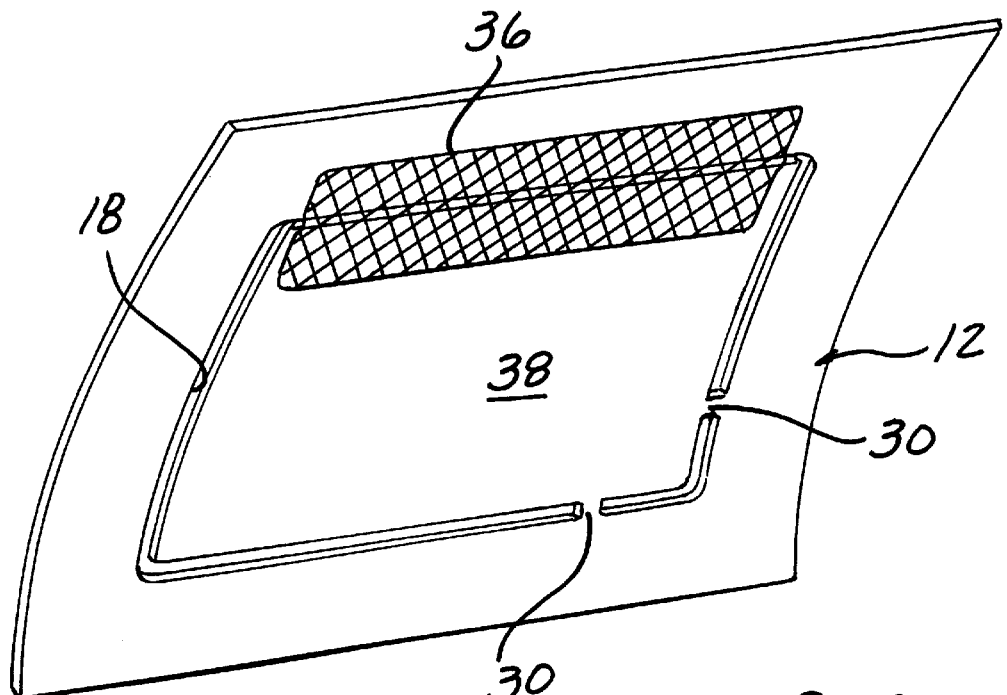
FIG. 3 is a perspective view of a single door substrate panel formed as a part of the process according to the present invention, having a hinge reinforcement added.
Figure 4:
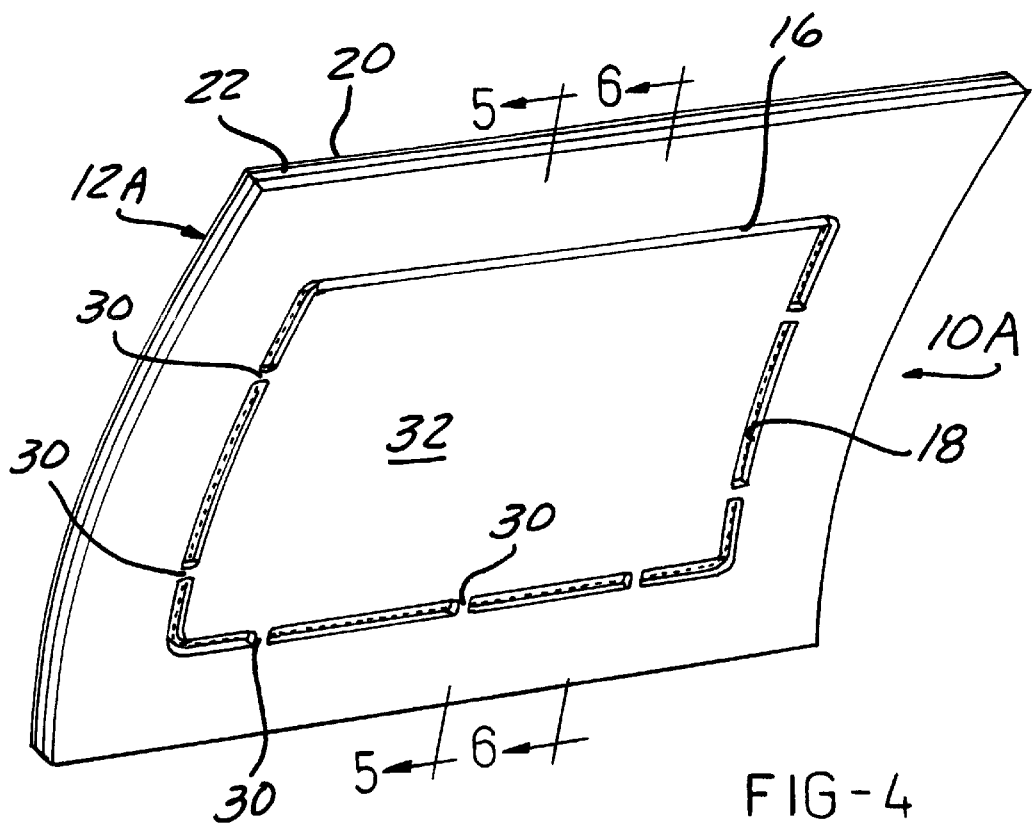
FIG. 4 is a perspective view of a trim piece formed by the process according to the present invention.
Figure 5:
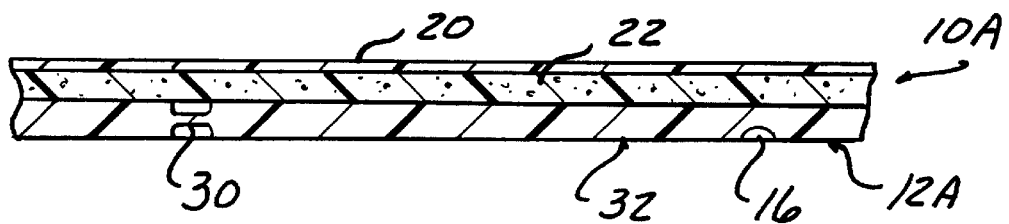
FIG. 5 is a view of the section 5—5 taken in FIG. 4.
Figure 6:
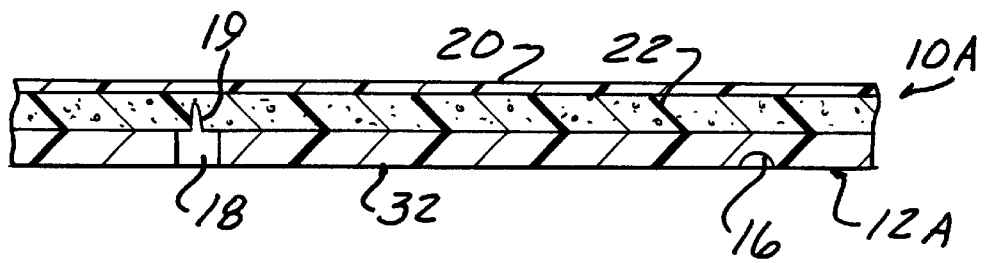
FIG. 6 is a view of the section 6—6 taken in FIG. 4.

FIG. 3 shows the addition of a hinge reinforcement 36, such as a sheet of scrim, which can be attached to insure that the door panel 30 does not break free. An integrally molded reinforcement may also be employed. Such a reinforcement could also be extended to cover the complete door panel.

FIGS. 4–8 show further details of the trim piece 10 made by the process of the present invention.

The covering layers may comprise a polymeric, leather or fabric skin 20 and foam plastic layer 22 overlying the substrate 12.

Figure 7:
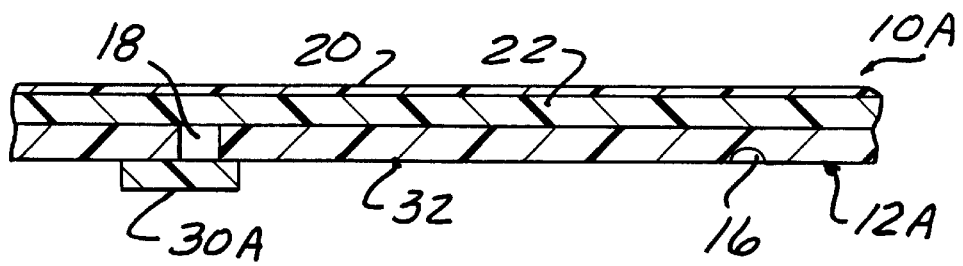
FIG. 7 is a view of the section taken through a trim piece having an alternate form of the tab features.

The tabs 30 can take various design configurations and extend across the gap 18. The tabs can be integrally molded with the substrate or can be attached to the substrate separately as shown in FIG. 7. The hinge 16 may comprise a reduced cross section area recessed in from either surface of the substrate panel 12A.

Figure 8:
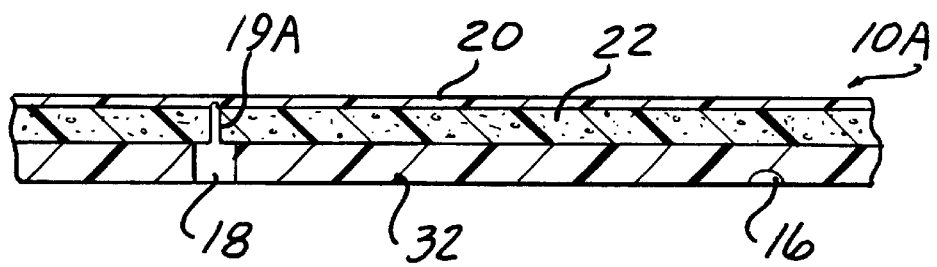
FIG. 8 is a sectional view showing an alternate form of preweakening of the covering layers.

The weakening cut or cuts 19 are aligned with the gap 18 and may only penetrate the foam layer 22 (FIG. 6) or a cut 19A may extend into the skin 20 (FIG. 8).

FIG. 7 shows a tab 30A which is not integral but rather underlies the door panel 14 to provide support against inward pushing forces applied to the outside of the trim piece 10.

Forming of the substrate panel can be done in several ways including injection molding, casting or thermoforming. Preferred materials for the substrate panel comprise thermoset and thermoplastic polymers but other materials can be used, including wood fiber and metal. An air bag canister can also be included as an integral part of the substrate panel. The door panel or panels can be made integrally with the substrate panel (i.e., door and substrate molded simultaneously into one piece) or made separately (i.e., substrate panel molded with door opening and door panel attached to substrate panel subsequently). The door panel or panels and particularly the hinge can be further reinforced via rigid or flexible materials (hard plastic scrim fabric, metal, etc.). This reinforcement can take place either during any forming of the substrate panel, i.e., by co-molding scrim fabric with integral deployment door hinge, or after forming of the substrate door panel. The gap separation between the door panel sides and the substrate panel can be complete with no material joining the two panels or partial. The optional stiffener frame either integral with the substrate panel or separate may also be located extending outside and around the door opening perimeter. Alternatively, the substrate panel may be attached to the air bag canister through fasteners or bolts located around the door perimeter.

The covering layers can be flexible or rigid and include foams, leather, vinyl/TPO/TPE/TPU skins, fabrics and laminated wood. In a foam/skin/construction, injection of plastic foam between the skin and substrate layers generally requires that the door perimeter gap be temporarily sealed to allow proper foam expansion. Pre-weakening of one or more of the covering layers can be carried out by any of several contacting or non-contacting scoring-cutting techniques, i.e., mechanical knife, water jet, ultrasonic cutting, etc. A preferred method is cutting or scoring with a laser beam that can pre-weaken rapidly, accurately and in any desirable configuration and pattern, i.e., continuous or semi-continuous grooves, perforations, slots, etc. The preweakening scoring or cutting can be carried out from either side of the substrate panel but preferably from the inside.

If a laser beam is utilized, this enables the trim piece manufacturer to first assemble the trim piece and then rapidly and accurately pre-weaken the covering layers through or along the separation between the substrate panel and the door panel or panels without having to cut through the substrate panel, which can be of substantial thickness.

During the preweakening step, gauging of the thickness of the covering layer or layers thickness can be included to better control the laser so that it removes the desired amount of covering material. Gauging can be done from either side of the covering layer or layers using any of various types of sensors, including ultrasonic, infrared, and capacitance type sensors.

What is claimed is:

1. A process for constructing a trim piece having a section preweakened in a pattern to allow formation of one or more deployment doors for an air bag installment to be overlain by said trim piece preweakened section, the process comprising the steps of:

forming a stiff substrate panel with one or more door panels recessed into said substrate panel, with a gap between portions of said one or more door panels and surrounding portions of said substrate, said gap formed at the same time said substrate panel is formed, said gap extending completely through said substrate panel, said forming step including the step of forming said one or more door panels so as to be joined along one side to the remainder of said substrate panel to form a hinge;

thereafter overlaying said substrate panel and said door panels with one or more cover layers extending across said substrate panel and said one or more door panels to bridge said gap therebetween; and subsequently preweakening at least one of said overlaying one or more covering layers by cutting into the inside of said cover layers through said preformed gap in said substrate.

2. A process according to claim 1 wherein in said preweakening step said cutting is continuous.

3. A process according to claim 2 wherein said preweakening step includes the step of cutting a groove into said covering layers.

4. A process according to claim 1 wherein said preweakening step includes the step of intermittently cutting said covering layers.

5. A process according to claim 4 wherein said preweakening step includes the step of cutting perforations at least partially into said covering layers.

6. The process according to claim 1 wherein said preweakening step includes the step cutting said cover layers with a laser.

* * * * *

UNITED STATES PATENT AND TRADEMARK OFFICE
CERTIFICATE OF CORRECTION

PATENT NO.    : 6,453,535 B1                                                           Page 1 of 1
DATED         : September 24, 2002
INVENTOR(S)   : Antonios Nicholas It is certified that error appears in the above-identified patent and that said Letters Patent is hereby corrected as shown below:

Column 1,
Line 9, delete "of" and insert therefor -- on --.

Column 3,
Line 36, delete "14" and insert therefor -- 12 --.
Line 38, delete "18A" and insert therefor -- 18 --.
Line 44, delete "30" and insert therefor -- 38 --.
Line 63, delete "14" and insert therefor -- 14/32 --.
Line 65, delete "10" and insert therefor -- 10A --.

Column 4,
Line 28, delete "foam/skin/construction" and insert therefor -- foam/skin construction --.
Line 33, delete "scoring-cutting" and insert therefor -- scoring cutting --.
Line 53, between "capacitance type" insert -- - --.

Column 6,
Line 11, after "the step" insert -- of --.

Signed and Sealed this

Eighteenth Day of March, 2003

JAMES E. ROGAN
*Director of the United States Patent and Trademark Office*